Sept. 5, 1950      M. SENS-OLIVE      2,521,418
MULTIPLYING DEVICE
Filed Feb. 25, 1948      9 Sheets-Sheet 1
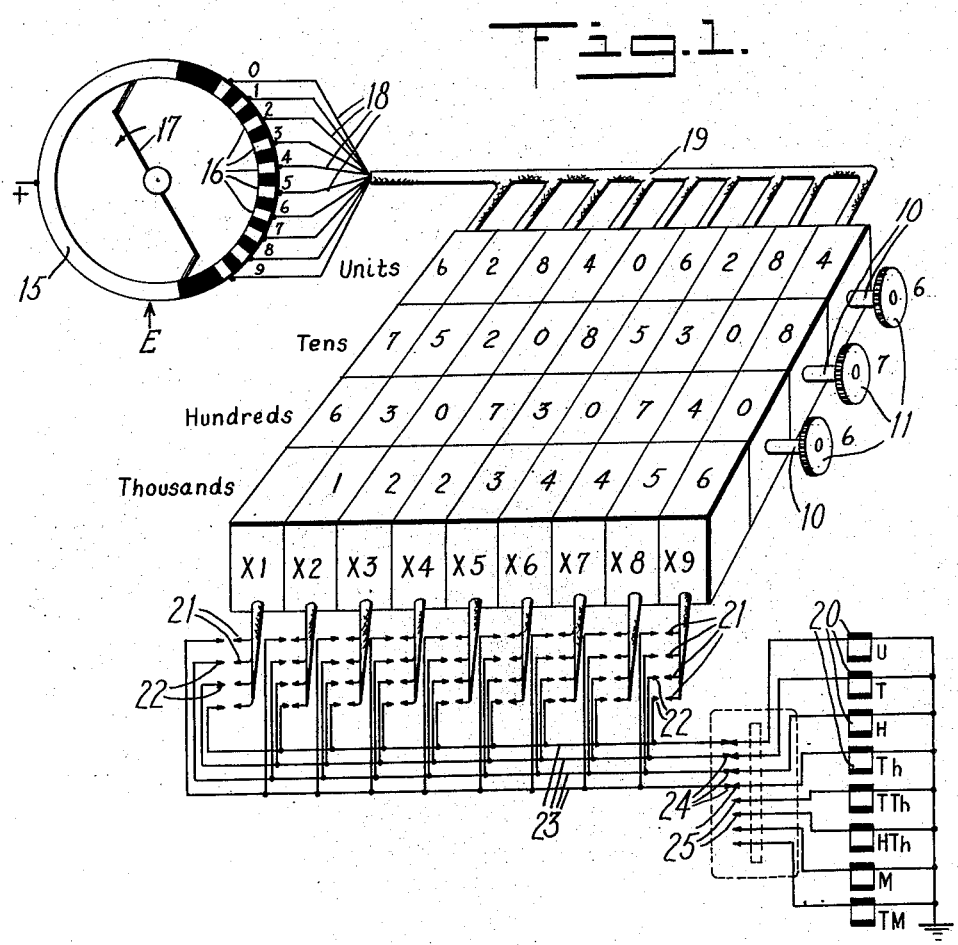
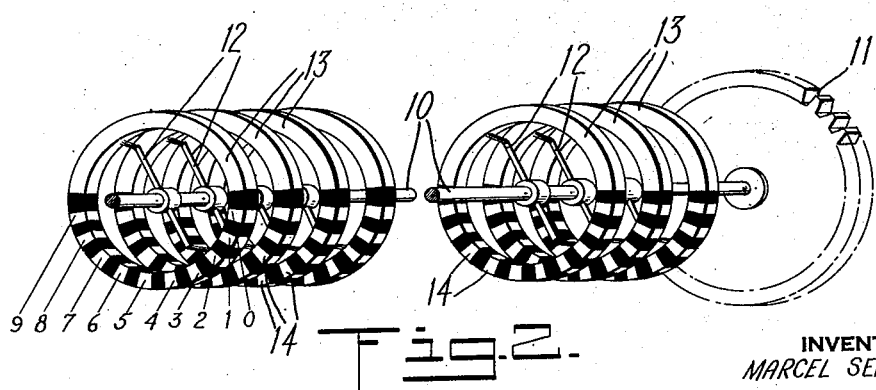
INVENTOR
MARCEL SENS-OLIVE
BY
*William Lang*
ATTORNEY

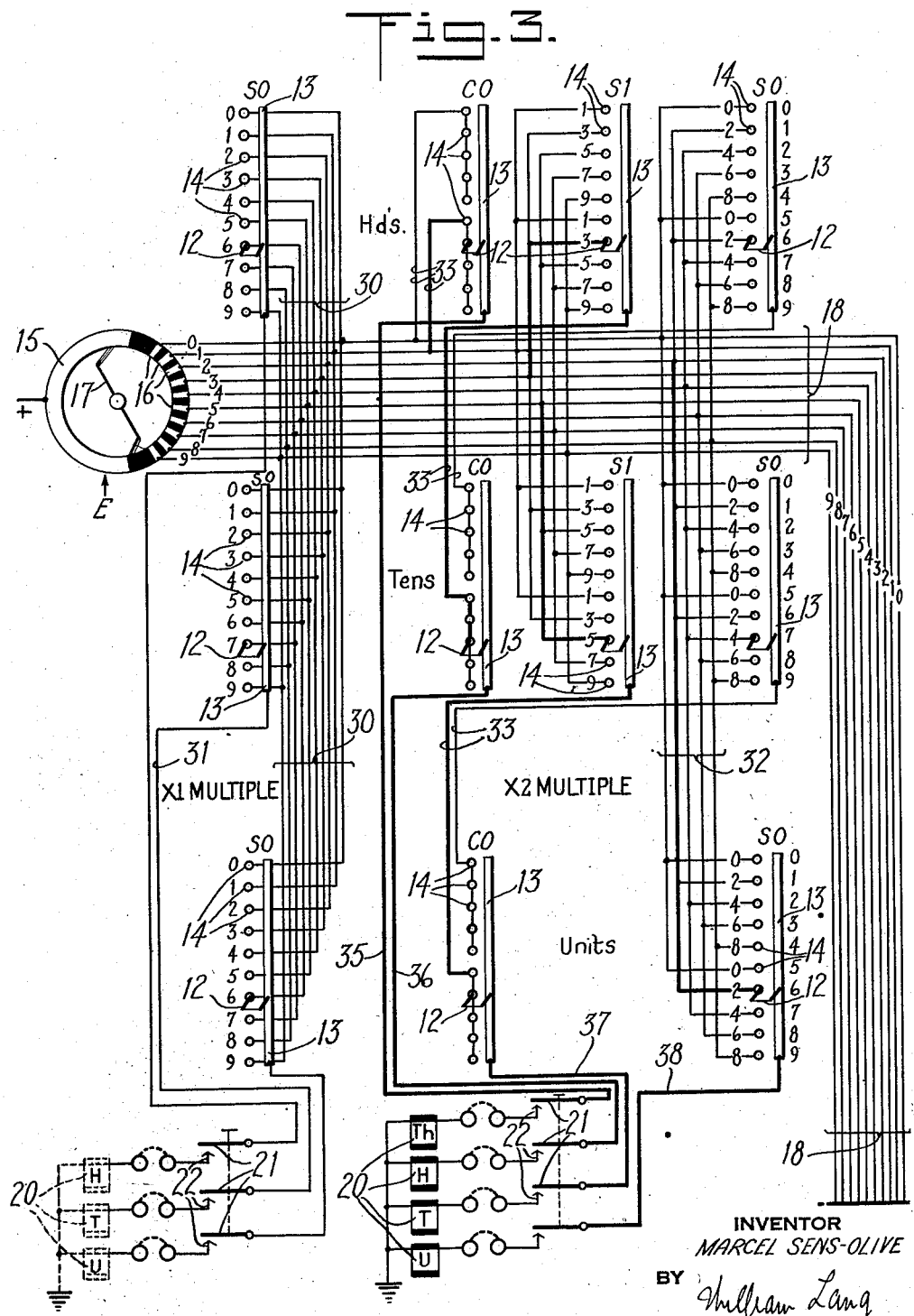

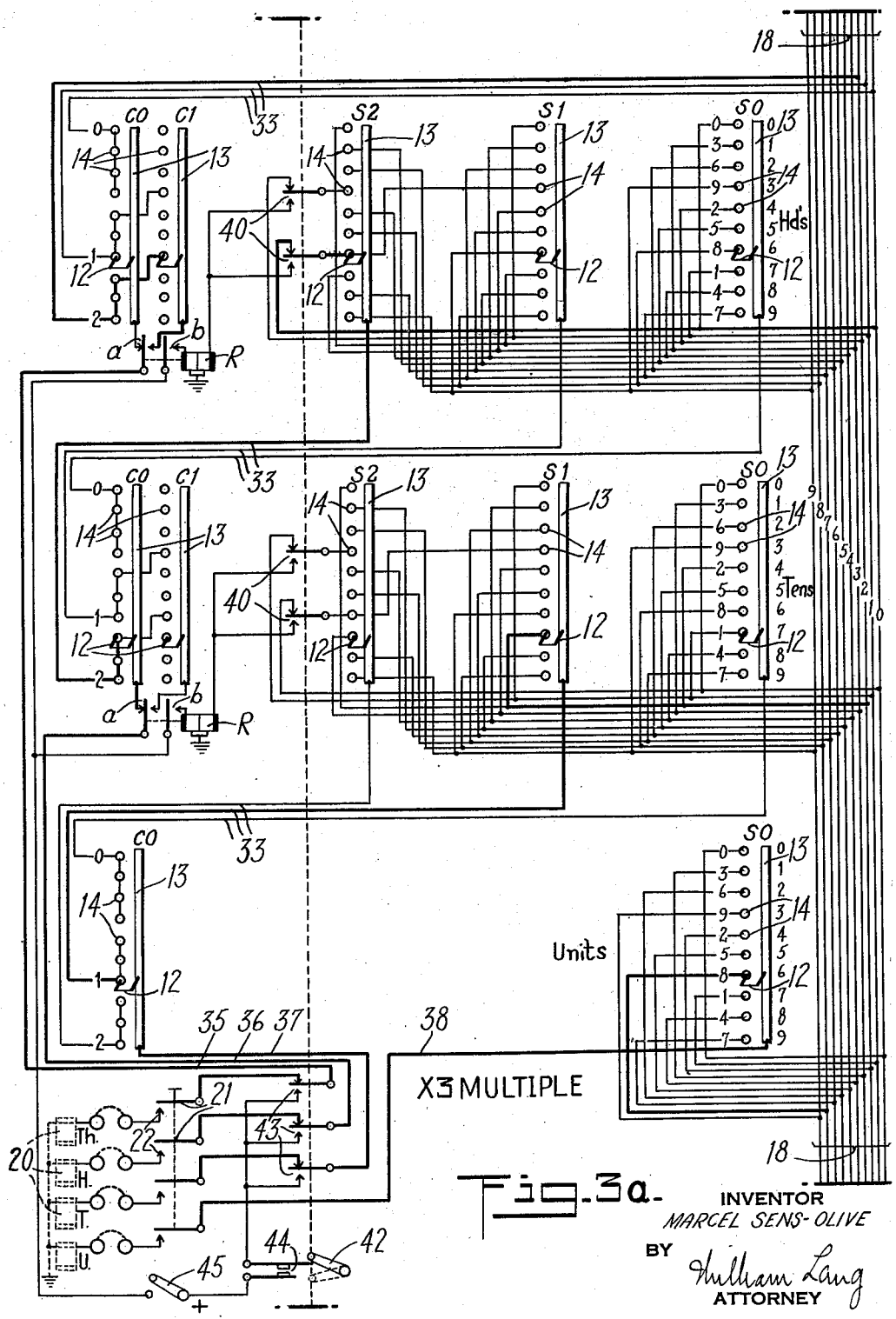

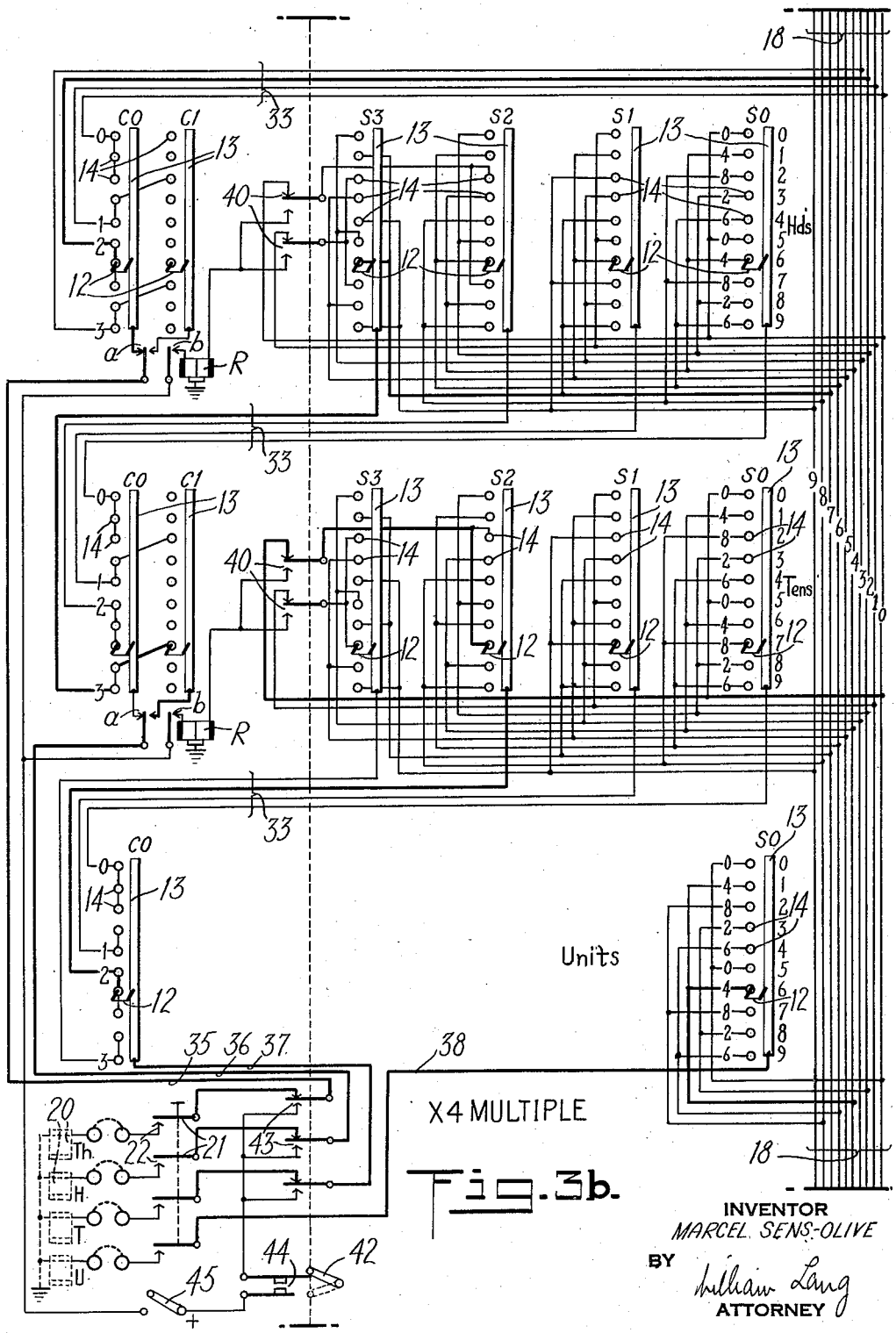

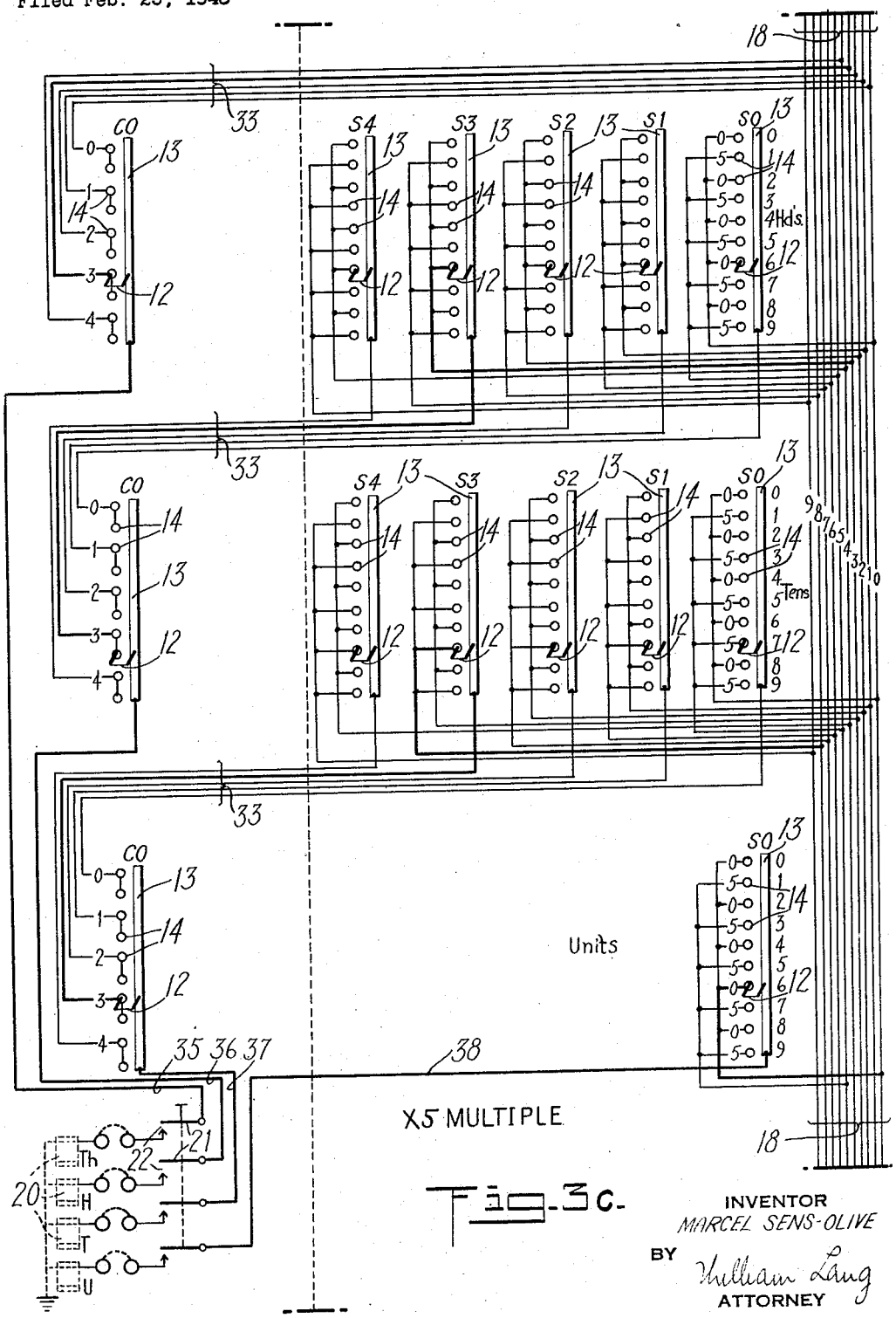

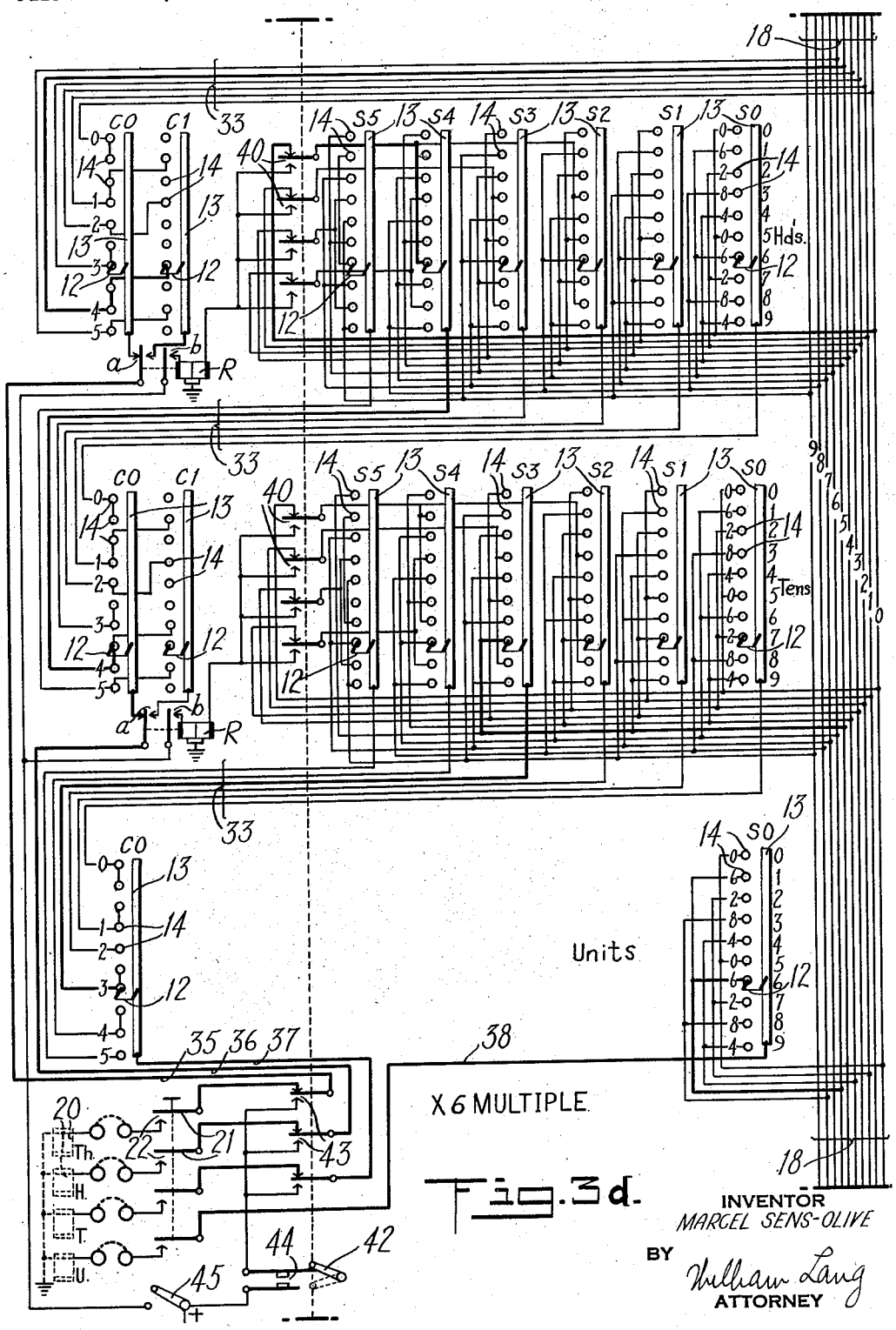

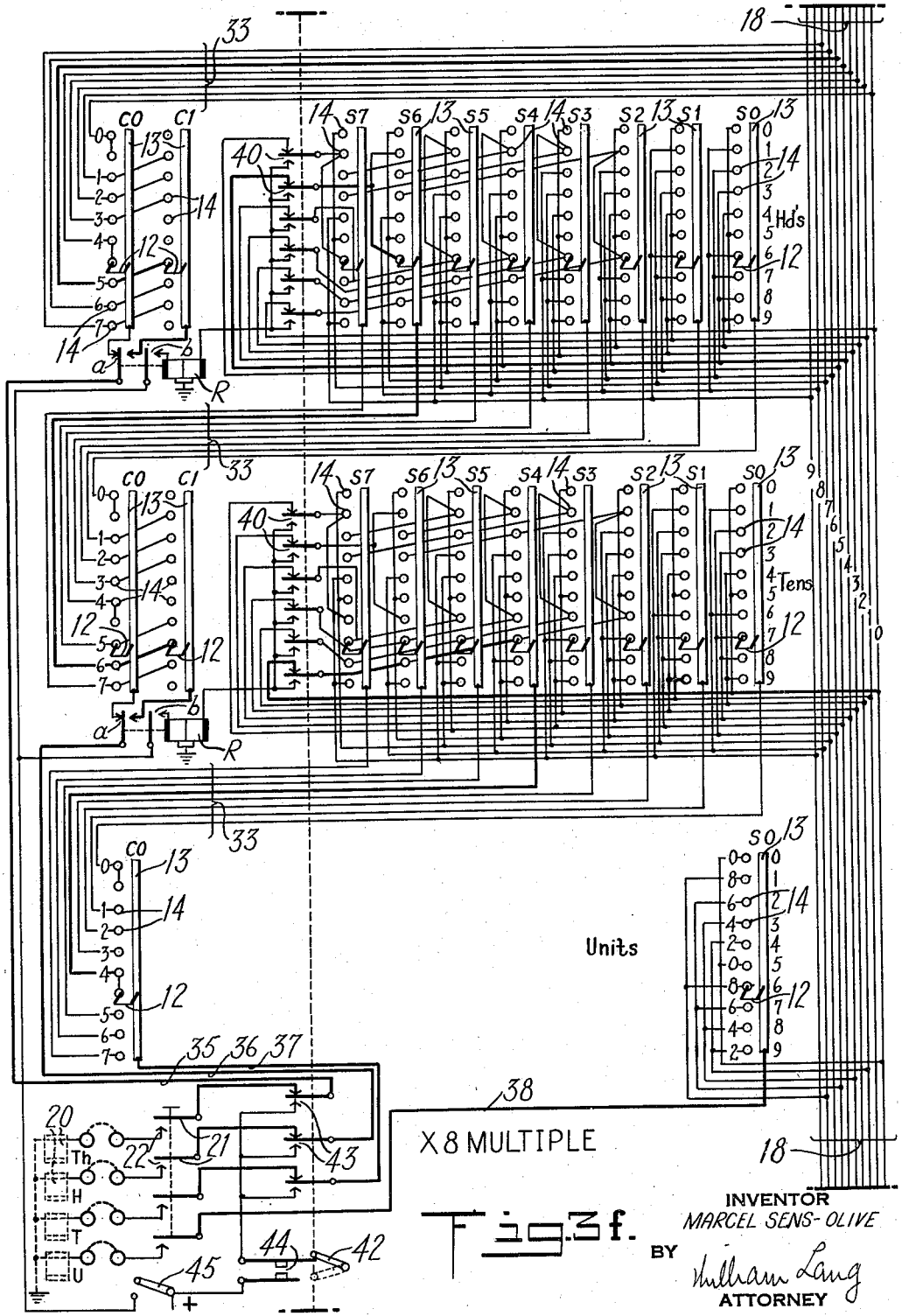

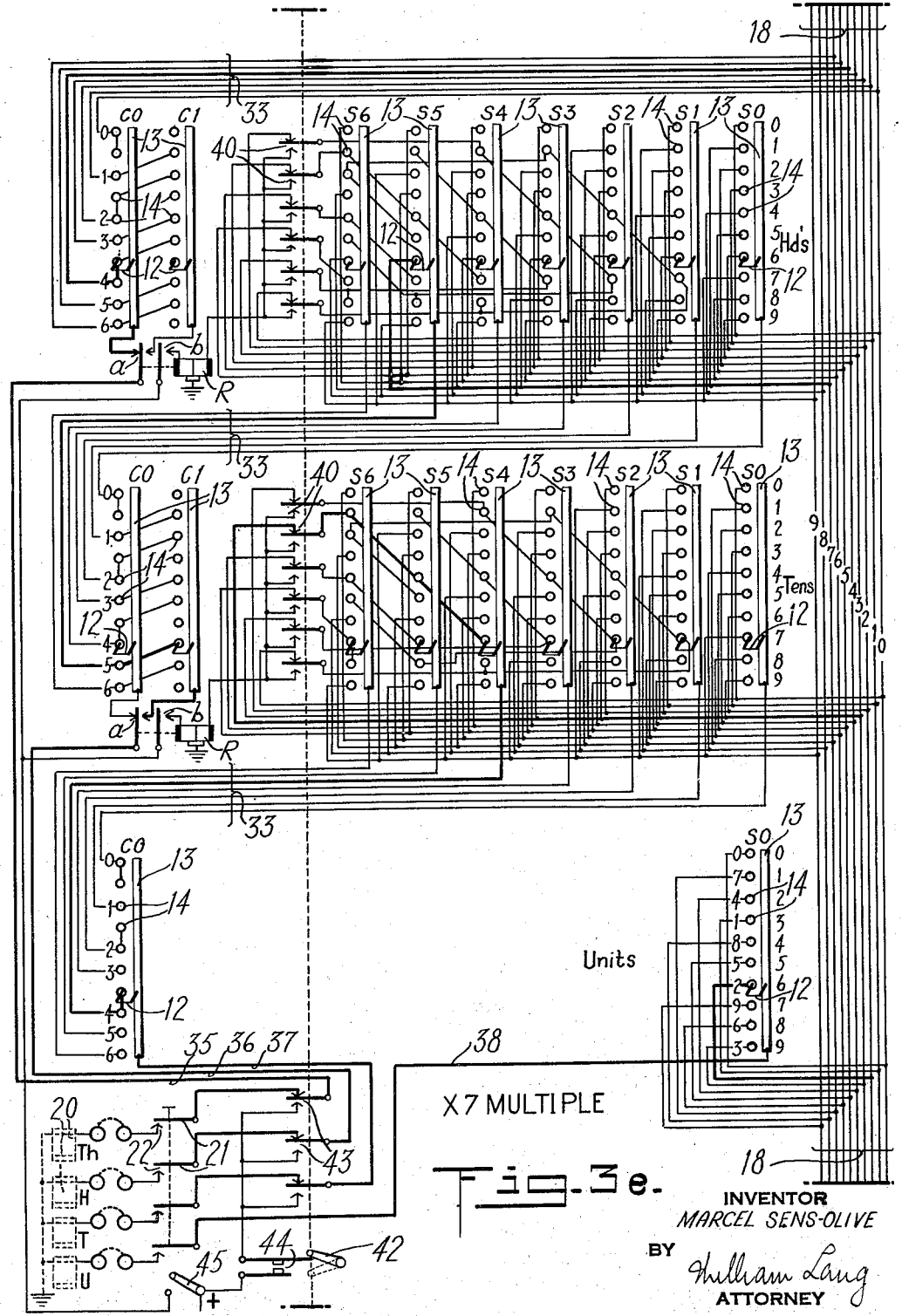

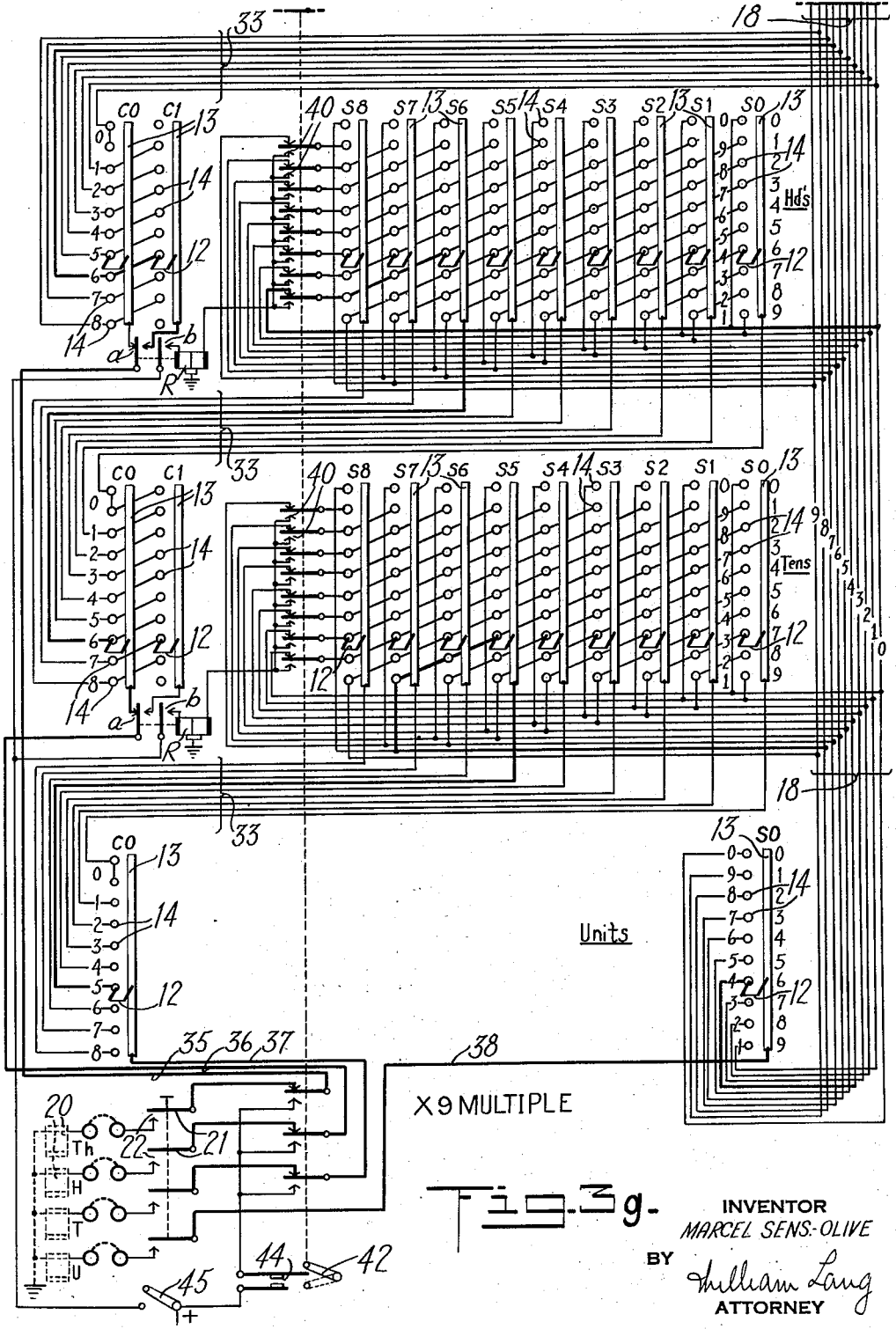

Patented Sept. 5, 1950

2,521,418

UNITED STATES PATENT OFFICE 2,521,418

MULTIPLYING DEVICE

Marcel Sens-Olive, Paris, France, assignor to International Business Machines Corporation, New York, N. Y., a corporation of New York Application February 25, 1948, Serial No. 10,635
In France May 11, 1943

Section 1, Public Law 690, August 8, 1946
Patent expires May 11, 1963

4 Claims. (Cl. 235—61)

The present invention relates to improvements in calculating machines and more particularly to multiplying and dividing machines.

In certain types of multiplying machines, the multiples of 1 to 9 times the multiplicand are computed and set up, and these are selectively entered into an accumulating device in succession in accordance with digits of a multiplier to obtain the product, provision being made for appropriate denominational allocation of the multiples.

Also in certain types of dividing machine, the multiples of 1 to 9 times the divisor are computed and set up, and these are compared with a dividend to ascertain which is the highest multiple that is less than such dividend.

The principal object of the present invention is to provide a simple apparatus in which a setting may be made representative of a multidenominational amount and in which such setting will effect an adjustment of a computing network from which any or all of the multiples of 1 to 9 times the amount can be directly read out.

In multiplying any multidenominational number by a single digit, the product is obtained by forming a series of subproducts representing the digit times each of the digits of the number. Thus, for 3 times 675, we first form 3×5=15, 3×7=21, and 3×6=18. These are then summed up as follows:

```
      6 7 5
    ×     3
    ———————
        1 5   units
      2 1     tens
    1 8       hundreds
    ———————
    2 0 2 5
``` resulting in the product 2025.

Each subproduct, such as 15, has a right hand component (as 5) and a left hand component (as 1). In adding the subproducts, each right hand component of the tens and higher subproducts is added to the left hand component of the next lower subproduct to obtain the related result digit and in some cases there is a tens carry which will increase the result digit by 1.

In the apparatus of the invention, a circuit network is provided which is initially adjusted in accordance with a given number and such adjustment will establish circuit paths representative of the sum of the several subproducts to obtain their sum (with each left hand digit added to the right hand digit of higher order) without tens carries. Thus, for the example above, the entry of 675 will initially adjust the network to effect reading out of 1025. This represents the sum of the subproducts of 3 times 675, namely, the sum of 15, 21 and 18 as above but without the tens carry from the hundreds to the thousands order. Prior to such reading out, however, the network is tested to ascertain where tens carries are required, and the network is thereupon readjusted to increase the readout digit values accordingly. Thus, in the thousands order of the product for the example 3 times 675, the readjustment will cause a 2 to be read out instead of the initial 1.

It may be said, therefore, that the initial setting of the network provides circuit paths to potentially read out the product of an amount times a digit, so that such product represents the sum of the several subproducts, without tens carries, and that the network is then readjusted to include such tens carries to represent the complete product.

In carrying out the objects of the invention, there is provided a separate network for each of the multiplier digits 1 to 9 and the setting up of an amount will concurrently adjust all the networks to establish in each the related product without carries. The carry readjustment is then effected concurrently for each network so all complete products become available for reading out.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagrammatic view showing the general arrangement of the apparatus.

Fig. 2 is a detail in isometric of one order of the amount setup device.

Figs. 3, 3a, 3b, 3c, 3d, 3e, 3f and 3g taken together and arranged vertically in the order named constitute a wiring diagram of the electrical circuits of the apparatus.

In Fig. 1 is shown diagrammatically the general arrangement of the apparatus in which nine oblique blocks designated X1 to X9 each represents a part of the apparatus containing a circuit network appropriate to the multiplying of an amount by a related digit 1 to 9. These blocks are subdivided into horizontal denominational orders through each of which there extends a shaft 10 having a gear or wheel 11 or other rotating device on its end, through which the shaft may be rotatively positioned to represent a digit of an amount.

Fig. 2 shows one of the shafts 10 which has secured thereto and insulated therefrom a series of double contact brushes or wipers 12 each in contacting engagement with an arcuate conductor 13 and one of a ring of ten contact segments 14, there being a segment for each of the digits 0 to 9. The brushes 12 and like valued segments 14 are all in axial alignment, so that when wheel 11 is turned all the brushes move in unison to connect the conductors 13 to the same line of segments 14. Thus, in Fig. 2 brushes 12 are set to all contact their related 2 segments 14.

In the operation of the apparatus, wheels 11 are set to represent an amount, for example 676, and then a carry readjustment is effected, as will be explained in connection with the circuit diagram, following which the separate oblique sections of the apparatus will have their related networks set to represent the nine values indicated as 676 for 1 times 676, 1352 for 2 times 676, 2028 for 3 times 676, 2704 for 4 times 676, etc.

A distributor or emitter E is provided with an arcuate conductor 15 connected to a positive side of a current source. Ten segments 16 are traversed by brush 17, so that current impulses are successively transmitted through wires 18 enclosed in a cable 19 to each of the nine networks.

Magnets 20 represent controlling magnets of a well known adding mechanism, which are responsive to differentially timed impulses sent thereto during a cycle of operation of the adding mechanism to enter therein a digit value. Brush 17 of emitter E is geared to the adding mechanism and rotated therewith, so that brush 17 contacts the segments 16 in the order 9, 8, 7, 6, etc. at times appropriate to the entry of corresponding digits into the adding mechanism. These impulses pass through the computing networks to readout contact points 21 which may be selectively connected to contact points 22, so that the impulses are directed through wires 23 to column shift contacts 24, 25, and thence to adding magnets 20. If, for example, it is desired to multiply 676 by 843, the operation is as follows. After wheels 11 are set at 676 and the circuits have been adjusted for carries, contacts 21, 22 in the X3 section are closed and the emitter E rotated a half revolution to complete circuits representing 2028 to the four upper magnets 20. Contacts 25 are then shifted up one step, contacts 21, 22 in the X4 section are then closed and emitter E again rotated to complete circuits representing 2704 to the magnets 20 with a column shift of one place. Next, contacts 25 are shifted up another step, contacts 21, 22 in the X8 section are closed, and emitter E again rotated to complete circuits representing 5408 to the magnets with column shift. This results in the addition of

```
        2 0 2 8
      2 7 0 4
    5 4 0 8
    ───────────
    5 6 9 8 6 8
``` to obtain 569,868, the product of 676 times 843.

The adding and column shift mechanism are not shown in detail as the invention primarily concerns the apparatus for forming the series of 1 to 9 multiples of a number and making them available at contacts 21 from which point connections may be made to magnets for controlling other similar differentially controlled devices.

*1X multiple*

In Fig. 3 the contact segments 14 are diagrammatically represented in a straight line and the brushes are set to represent the number 676. Since the reading out of 1 times a number involves no tens carry, the readout is direct. Emitter E transmits impulses from the plus side of current source to a group of lines 18 from which wires 30 extend to correspondingly numbered segments 14 in the three orders shown so that, when brush 17 engages the 9 segment 16, current is sent to all 9 segments 14. When brush 17 engages the 8 segment 16, current is sent to all 8 segments 14. When brush 17 engages the 7 segment 16, current is sent to all 7 segments 14 and in the tens order it continues through brush 12 (set at 7) to its conductor 13, and thence through a wire 31 to contacts 21, 22 (previously closed) to energize magnet 20 in the tens order at the 7 time to enter a 7 in the adding device.

*2X multiple*

In the X2 section of Fig. 3, the units order is provided with two brushes 12 and related segments 14 and conductors 13. The tens and hundreds orders are provided with three. It is to be noted that in multiplying any number by 2 there is never a tens carry required, so for this multiple the readout is direct without any readjustment of circuits after brushes 12 are set to represent a number (as 676, for example). The right hand set of segments 14 of the X2 multiple designated S0 are connected by a set of wires 32 to lines 18 in accordance with the right hand digit of twice the value of the segment. Thus, the 1 and 6 segments are connected to the 2 wire 18, the 2 and 7 segments are connected to the 4 wire 18, the 3 and 8 segments are connected to the 6 wire 18, the 4 and 9 segments are connected to the 8 wire 18 and the 5 and 0 segments are connected to the 0 wire 18.

The central set of segments 14 in the tens and hundreds orders designated S1 are connected to lines 18 in accordance with a value one unit higher than for the corresponding segment in the right hand column S0.

Thus, the 0 and 5 segments are connected to the 1 wire 18, the 1 and 6 segments are connected to the 3 wire 18, the 2 and 7 segments are connected to the 5 wire 18, the 3 and 8 segments are connected to the 7 wire 18, and the 4 and 9 segments to the 9 wire 18.

In each order the segments 14 in the left hand columns designated C0 are wired together in the 0 to 4 positions and through the 0 wire 33 to the right hand or S0 contacts in the higher order. The segments 5 to 9 are also wired together and connected through the 1 wire 33 to the middle or S1 conductor of the higher order. In the highest order the 0 and 1 wires 33 connect directly to the 0 and 1 wires 18, respectively.

With this wiring arrangement, impulses from emitter E will flow through the network to directly energize magnets 20 in accordance with the product 1352, the circuits involved being emphasized in heavy lines. It is to be noted that in adding the subproducts obtained in multiplying any number by 2, no tens carries are involved and that the network constitutes an adding chain for summing up the subproducts with the denominational offset in the order

```
      6 7 6
      × 2
    ───────
          1 2
        1 4
      1 2
    ───────
      1 3 5 2
```

The circuit for the thousands order extends from the 1 line 18, 6 segment 14 of the hundreds order, brush 12, conductor 13, wire 35, contacts 21, 22 to the thousands magnet 20. The circuit for the hundreds order extends from the 3 line 18, 6 segment in the hundreds order, 1 wire 33 to the 7 segment in the tens order, brush 12, conductor 13 and wire 36 to the hundreds magnet 20.

The circuit for the tens order extends from the 5 line 18, 7 segment of the middle tens section S1, brush 12, conductor 13, 1 wire 33, brush 12 set at 6 in the units section and wire 37 to the tens segment 20. The units circuit is directly through the right hand brush 12 set at 6 from the 2 line 18, through a wire 32 and wire 38 to the units magnet 20.

Analyzing the arrangement, the right hand units brush setting connects the units magnet 20 directly to the line 18 representing the units or right digit of 2 times the value of the brush setting. The left hand units brush setting connects the tens magnet 20 to either the first or second (from the right) brush setting in the tens order which, as noted, connect respectively to lines 18 representing the units digits of the tens subproduct (14) or one unit higher (5) which are the two possible sums of the units order left hand component 0 or 1, and the tens order right hand component 4.

Likewise, the left hand tens brush setting connects the hundreds magnet 20 to either the first or second brush setting in the hundreds order connecting respectively to lines 18 representing the units digits of the hundreds subproduct (12) or one unit higher (3), which are the two possible sums of the tens order left hand component 0 or 1 and the hundreds order right hand component 2. The left hand component of the hundreds subproduct (12) is a direct readout through wire 35 to the thousands magnet 20.

This circuit network may be defined, when adjusted, to represent any number as being arranged in accordance with the table of addition of the subproducts of the number times the digit 2, in offset alignment, to produce the product of the number times 2. Or it may be defined as being arranged to select from a series of digit representing impulses or lines the ones representing the values of the product digits in response to a setting of a number and the operation of emitter E.

3X multiple

Fig. 3a shows the circuit network arrangement for obtaining the 3 times multiple. When multiplying by 3 all left hand subproduct digits will be either 0, 1 or 2 and, as noted in the units order, the segments 14 are connected in the 0 to 3 brush positions to the 0 wire 33, in the 4 to 6 brush positions to the 1 wire 33, and in the 7 to 9 brush positions to the 2 wire 33. Likewise, in higher orders the same grouping and connections to 0, 1 or 2 wires 33 prevails. In all orders, the right hand set of segments 14 connected to wires 18 represents the right hand components of 3 times all the digits for direct reading out if the lower subproduct has no significant left hand component.

In the tens and higher order there are provided a second and third readout section whose segments connect to lines 18 one and two units higher, respectively, than the corresponding segments 14 of the right hand sections.

For convenience in explaining the operation, the readout sections are identified as S0, S1 and S2 for each order, to represent the selection of S0 for controlling the readout circuit for an order when the lower order has a 0 left hand component. S1 controls when the lower order has a 1 left hand component, and S2 controls when the lower order has a 2 left hand component.

The readout sections controlling the selection of the 0, 1 and 2 wires 33 are identified as C0, and this section controls or directs the readout circuit when there is a no tens carry out of the related order. A further readout section designated C1 is provided in the tens and hundreds order which, as will presently be explained, controls the circuit when there is a tens carry out of the related order.

It will first be noted that in adding the subproducts, the tens carry between orders is either 0 or 1, and that for the 3 times multiple the carry of 1 can occur only when a higher order brush 12 is set at either 3 or 6, that is, in positions where a 9 or an 8 might be read out and to which a 1 or a 2 might be added.

The operation may best be explained by considering the example 676 times 3, with the brushes 12 set to represent the number. After the brushes are set, as explained, switch 42 is shifted to its dotted line position to shift contacts 40 and 43 and close contacts 44. This shift will cause circuits to be completed to carry relay magnets R related to orders from which a unit is to be carried. Thus, for the example

```
    6 7 6
    ×   3
   ───────
        1 8
      2 1
    1 8
   ───────
    2 0 2 8
``` a unit is to be carried from the hundreds to the thousands order, so the magnet R in the hundreds order is to be energized. The circuit therefore is traceable from plus side of current source through contacts 44, middle contacts 43 (shifted) wire 36, a contacts of magnet R of the tens order (normal), conductor 13 of section C0, brush 12 (set at 7), 2 wire 33 to conductor 13 of section S2 in the hundreds order, brush 12 (set at 6), contacts 40 (shifted) and magnet R in the hundreds order to ground. Magnet R will shift its a and b contacts, the latter providing a holding circuit through switch 45, which is closed shortly after switch 42 is closed. Next, switch 42 is reopened and the emitter is operated to cause the true product to read out.

The sequential operation of switches 42, 45 and emitter E is described as being manual for simplicity, but it will be understood that suitable timing devices may be employed to effect their operation.

When emitter E now operates, the heavy line circuits will be completed to enter the product 2028 into magnets 20. In the units order this circuit is traceable from the 8 line 18, through brush 12 in section S0 of the units order and wire 38 to the units magnet 20.

In the tens order the circuit is traceable from the 2 line 18, brush 12 in section S1 of the tens order, 1 wire 33 to brush 12 in section C0 of the units order, wire 37 and contacts 43 (normal) to the tens magnet 20.

In the hundreds order, the circuit is traceable from the 0 line 18, contacts 40 (normal), brush 12 in section S2, 2 wire 33, brush 12 in section C0 of the tens order, a contacts of magnet R (normal), wire 36, contacts 43 (normal) to the hundreds magnet 20.

In the thousands order the circuit is traceable from the 2 line 18, brush 12 in section C1 of the hundreds order, a contacts of magnet R (shifted), wire 35 and contacts 43 to the hundreds magnet 20.

It will be noted that the circuit to the thousands magnet 20 is initially routed from the 1 wire 18, through section C0 of the hundreds order and that upon the carry adjustment the routing is shifted to run from the 2 wire 18, through section C1.

To illustrate the condition wherein a so-called carry on carry is involved, let us consider the example of 3 times 669 which gives the following subproducts:

```
      6 6 9
      ×   3
      -----
          2 7
        1 8
      1 8
      -----
      2 0 0 7
```

It will be noted that the summation requires a tens carry from the tens to the hundreds order, which added to the sum of 8 and 1 in the hundreds order requires a carry from such hundreds order to the thousands order. Under these conditions, the magnets R in both the tens and hundreds orders will be initially energized when switch 42 is operated. The circuit for the tens order is traceable from plus side of current source, through contacts 44, lowest contacts 43 (shifted), wire 37, conductor 13 in the units order of section C0, brush 12 (set at 9), the 2 wire 33 to conductor 13 of section S2 in the tens order, brush 12 (set at 6), contacts 40 (shifted), and magnet R in the tens order to ground. Its a and b contacts accordingly shift and remain so when switch 45 is closed.

For the hundreds order, the circuit is traceable from plus side of current source, through contacts 44, middle contacts 43 (shifted), wire 36, a contacts of magnet R of the tens order (shifted), conductor 13 of section C1, brush 12 (set at 6), 2 wire 33 to conductor 13 of section S2 in the hundreds order, brush 12 (set at 6), contacts 40 (shifted), and magnet R in the hundreds order to ground.

When switch 42 is reopened, the emitter is operated and the complete product 2007 will be read out through readily traceable circuits. It will be noted that the initial tens carry test and setup takes into account the so-called carry-on-carry conditions and will energize magnets R associated with those orders from which a unit is to be carried, whether the carry is a so-called direct carry or a carry on a carry.

4X multiple

The circuits for this multiple are shown in Fig. 3b. Since the maximum value of left hand component digits is 3, there is provided in each order higher than units four readout sections S0, S1, S2 and S3 wired to progressively higher valued lines 18 with section S0 wired in accordance with the values of the right hand component digits. The C0 sections have four segment groupings extending to four wires 33 following the principles explained in connection with the ×3 readout.

Brushes 12 are set at 676 and, when switch 42 (which may be the same switch as in Fig. 3a or connected thereto for concurrent operation) is shifted, magnet R in the tens order will be energized, since a carry is to take place from the tens order in accordance with the principles set forth. The energizing circuit is traceable from the plus side of current source, contacts 44, contacts 43, wire 37, brush 12 in section C0 of the units order (set at 6), 2 wire 33, brush 12 in the S2 section of the tens order (set at 7), contacts 40 (shifted) and magnet R in the tens order to ground. Closure of switch 45 will establish the holding circuit, and with switch 42 reopened and emitter E operated the circuits emphasized in heavy lines will be completed to enter the product 2704 into magnets 20. It is believed the emphasized circuits are sufficiently clear in designating the several current paths, so that specific tracing thereof is not given here.

5X multiple

The circuits for this multiple are shown in Fig. 3c. Since the maximum value of left hand component digits is 4, there is provided in each order higher than units five readout sections S0, S1, S2, S3 and S4 wired to progressively higher valued lines 18 with section S0 wired to the 0 and 5 lines, since these are the only right hand component digits than can occur when multiplying by 5.

The C0 sections have five segment groupings extending to five wires 33 following the principles explained.

It will be particularly noted that, when multiplying by 5, there will be no tens carries so that for this multiple, as for the 2 times multiple, no C1 sections need be provided and incidently no readjustment of the network is required. Thus, upon setting of the number 676 and operation of emitter E the circuits will be completed to enter the product 3380 directly into magnets 20.

6X multiple

The circuits for this multiple are shown in Fig. 3d. Since the maximum value of left hand component digits is 5, there is provided in each order higher than units six readout sections S0, S1 to S5 wired to progressively higher valued lines 18 with sections S0 wired in accordance with the values of the right hand component digits. The C0 sections have six segment groupings extending to six wires 33 numbered 0 to 5 following the principles explained.

With brushes 12 set to represent 676 as before, closure of switch 42 will result in energization of magnet R in the hundreds order, since a carry is required out of this order. The energizing circuit is traceable from the plus side of current source, contacts 44, contacts 43, wire 36, a contacts of magnet R in the tens order (normal), brush 12 in the C0 section of the tens order, 4 wire 33, brush 12 in the S4 section of the hundreds order (set at 7), contacts 40 (shifted) and magnet R in the hundreds order to ground.

Closure of switch 45 will establish the holding circuit and with switch 42 reopened and emitter E operated the circuits emphasized in heavy lines will be completed to energize magnets 20 in accordance with the product 4056.

7X multiple

The circuits for this multiple are shown in Fig. 3e. Since the maximum value of the left hand component digit is 6, there is provided in each order higher than units seven readout sections S0, S1 to S6 wired in the progressive manner explained, with section S0 wired in accordance with the values of the right hand component digits. The C0 sections have seven segment groupings extending to seven wires 33 numbered 0 to 6 in accordance with the principles explained.

With brushes 12 set to represent 676 as before, closure of switch 42 will result in energization of magnet R in the tens order, since a carry is required out of this order. The energizing circuit is traceable from the plus side of current source 44, contacts 43, wire 37, brush 12 in the C0 section of the units order (set at 6), 4 wire 33, brush 12 in the S4 section of the tens order, contacts 40 and magnet R in the tens order to ground. Closure of switch 45 will establish the holding circuit and with switch 42 reopened and emitter E operated the circuits emphasized in heavy lines will be completed to energize magnet 20 in accordance with the product 4732.

8X multiple

The circuits for this multiple are shown in Fig. 3f. In accordance with the principles laid down, there are provided eight sections S0, S1 to S7 in the higher orders with the segments 14 of section C0 grouped to connect through eight wires 33 to the S sections of higher orders.

With brushes 12 set to represent 676 as before, closure of contacts 42 will result in energization of magnets R in both the tens and hundreds sections, since there is a carry required out of both of these orders. For the tens order, the circuit is traceable from plus side of course, contacts 44, 43, wire 38, brush 12 in section S0 of the units order (set at 6), 4 wire 33, brush 12 in section S4 of the tens order, contacts 40 and magnet R in the tens order to ground.

For the hundreds order, the circuit is traceable from the plus side of source, contacts 44, 43, wire 36, a contacts of magnet R (normal), brush 12 in section C1 of the tens order, 5 wire 33, brush 12 in section S5 of the hundreds order, contacts 40, and magnet R in the hundreds order to ground. Closure of switch 45 will establish the holding circuits and with switch 42 reopened and emitter E operated the circuits emphasized in heavy lines will be completed to energize magnets 20 in accordance with the product 5408.

9X multiple

The circuits for this multiple are shown in Fig. 3g, where sections S0, S1 to S8 are provided and ten wires 33 between orders. In the now familiar manner, when switch 42 is closed, magnet R in the hundreds order will be picked up for the problem 676×9, and thereafter circuits emphasized in heavy lines will be completed to energize magnets 20 in accordance with the product 6084.

Accordingly, the setting up of a multiplicand amount will condition or adjust separate circuits in each of the nine digit sections of the apparatus, for reading out of the separate products without tens carries. In the case of the 1, 2 and 5 multiples, this is the final product since no tens carries are ever required for these. In other cases, there is a test and incidental readjustment made resulting in the conditioning of the circuits to read out the complete products. By selectively operating the readout controlling contacts 21, 22, the products can be read out singly to one bank of receiving magnets or concurrently to a plurality of banks. These magnets may control known devices such as adding, printing or comparing devices, as may be consistent with the procedure contemplated.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, an entry receiving and retaining device comprising a set of similar denominationally ordered elements settable to represent a multidenominational number, a set of denominationally ordered magnets, an emitter for emitting a single group of timed impulses, one impulse for each of the digits 1 to 9, means controlled by said elements for initially selecting and making effective for control of said magnets only, the impulses corresponding to the product without tens carries of the number represented by the elements times a predetermined digit, and carry determining means controlled by the elements for ascertaining the tens carry requirements and for changing said initial selection to render the selecting means effective to select the impulses corresponding to the product, including tens carries.

2. In an apparatus of the class described, a series of current lines, one for each of the digits 1 to 9, a plurality of denominationally ordered magnets, a plurality of denominationally ordered sets of differentially positionable contact elements, settable to represent a multiplicand amount, the element in the units set upon positioning thereof effecting a separate electrical connection between a line representing the right hand component of the units multiplicand digit times 3 and the units magnet, the element in the tens set jointly with the element in the units set effecting a second electrical connection between a line representing the sum of the right hand component of the tens multiplicand digit times 3 plus the left hand component of the units multiplicand digit times 3, and the tens magnet, and means for sending current through said lines to energize the magnets through the said connections.

3. In an apparatus of the class described, a series of current lines, one for each of the digits 1 to 9, a plurality of denominationally ordered magnets, a plurality of denominationally ordered sets of differentially positionable contact elements, settable to represent a multiplicand amount, the element in the units set upon positioning thereof effecting a separate electrical connection between a line representing the right hand component of the units multiplicand digit times 3 and the units magnet, the element in the tens set jointly with the element in the units set effecting a second electrical connection between a line representing the sum of the right hand component of the tens multiplicand digit times 3 plus the left hand component of the units multiplicand digit times 3 and the tens magnet, the element in the hundreds set jointly with the element in the tens set effecting a third electrical connection between a line representing the sum of the right hand component of the hundreds multiplicand digit times 3 plus the left hand component of the tens muliplicand digit times 3 and the hundreds magnet, a carry magnet for each set of elements, means including part of said second connection for energizing the related carry magnet when said sum is 10 or more, means controlled by the energized magnet for changing the third connection to a line one digit higher in value, and means for sending current through said lines to energize the magnets through the said connections.

4. In an apparatus of the class described, a series of current lines, one for each of the digits 1 to 9, a plurality of denominationally ordered magnets, a plurality of denominationally ordered sets of differentially positionable contact elements, settable to represent a multiplicand amount, the element in the units set upon positioning thereof effecting a separate electrical connection between a line representing the right hand component of the units multiplicand digit times a predetermined digit and the units magnet, the element in the tens set jointly with the element in the units set effecting a second electrical connection between a line representing the sum of the right hand component of the tens multiplicand digit times said predetermined digit plus the left hand component of the units multiplicand digit times said predetermined digit and the tens magnet, the element in the hundreds set jointly with the element in the tens set effecting a third electrical connection between a line representing the sum of the right hand component of the hundreds multiplicand digit times said predetermined digit plus the left hand component of the tens multiplicand digit times said predetermined digit and the hundreds magnet, a carry magnet for each set of elements, means including part of said second connection for energizing its related carry magnet when said sum is 10 or more, means controlled by the energized carry magnet for changing the third connection to a line one digit higher in value, and means for sending current through said lines to energize the magnets through the said connections.

MARCEL SENS-OLIVE.

REFERENCES CITED

The following references are of record in the file of this patent:

UNITED STATES PATENTS

| Number | Name | Date |
|---|---|---|
| 2,199,537 | Campbell | May 7, 1940 |
| 2,332,304 | Davies | Oct. 19, 1943 |

FOREIGN PATENTS

| Number | Country | Date |
|---|---|---|
| 456,368 | Great Britain | Nov. 9, 1936 |